United States Patent
Zhang et al.

(10) Patent No.: US 7,779,093 B1
(45) Date of Patent: Aug. 17, 2010

(54) PROXY FOR NETWORK ADDRESS ALLOCATION

(75) Inventors: Shujin Zhang, San Carlos, CA (US); Jayadev Kumarasamy, Morgan Hill, CA (US); Xiao Gong, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1060 days.

(21) Appl. No.: 09/835,164

(22) Filed: Apr. 13, 2001

(51) Int. Cl.
G06F 15/177 (2006.01)
G06F 15/173 (2006.01)

(52) U.S. Cl. .................. 709/221; 709/220; 709/222; 709/223

(58) Field of Classification Search ......... 709/220–222, 709/223
See application file for complete search history.

(56) References Cited

U.S. PATENT DOCUMENTS

| | | | | |
|---|---|---|---|---|
| 5,884,024 | A * | 3/1999 | Lim et al. | 713/201 |
| 5,915,008 | A * | 6/1999 | Dulman | 379/221.08 |
| 6,070,187 | A * | 5/2000 | Subramaniam et al. | 709/220 |
| 6,189,102 | B1 * | 2/2001 | Beser | 713/201 |
| 6,240,464 | B1 * | 5/2001 | Fijolek et al. | 709/250 |
| 6,427,209 | B1 * | 7/2002 | Brezak et al. | 713/201 |
| 6,577,628 | B1 * | 6/2003 | Hejza | 370/392 |
| 6,611,868 | B1 * | 8/2003 | Arutyunov | 709/227 |
| 2002/0016922 | A1 * | 2/2002 | Richards et al. | 713/200 |

OTHER PUBLICATIONS

Michael Patrick, "DHCP Relay Agent Informaion Option", Motorola ISG, DHC Working Grop, Jul. 30, 1997.*
Michael Patrick, "DHCP Relay Agent Information Option", Internet Draft, Michael Patrick, Motorola BCS, Oct. 11, 2000 (1-15 pgs).
R. Droms,"Dynamic Host Configuration Protocol" Bucknell University, Oct. 1993.

* cited by examiner

*Primary Examiner*—Niketa I Patel
(74) *Attorney, Agent, or Firm*—BainwoodHuang

(57) ABSTRACT

This invention provides a method and apparatus for issuing or renewing a host address. The apparatus has an input device to receive a data packet having a host identifier, a memory to store a list of host identifiers, and a processor to match the host identifier with the list of host identifiers. If a match is found, an output device transmits the data packet to an address allocation device to issue or renew the host address. The method provides for retrieving the host identifier in the header of the data packet, matching the host identifier with a list of host identifiers, and maintaining a state of authentication for the host if a match is found, otherwise maintaining a state of unauthentication for the host. The method further provides for inserting a proxy address in a relay agent address field, setting a flag, and transmitting the data packet to an address allocation device to issue or renew the host address. The proxy address is also set in a server identifier address field and the flag is unflaged before any data packets are forwarded to the host.

28 Claims, 7 Drawing Sheets

| op 20 | htype | hlen | hops |
|---|---|---|---|
| xid ||||
| secs || flags ||
| ciaddr 24 ||||
| yiaddr ||||
| siaddr 22 ||||
| giaddr 26 ||||
| sname ||||
| file ||||
| options 18 ||||

FIG. 2
(Prior art)

PROXY FOR NETWORK ADDRESS ALLOCATION

FIELD OF THE INVENTION

The present invention relates to a method and apparatus for issuing or renewing a dynamically assigned host address in a data communications network. More particularly, the present invention relates to a method and apparatus for issuing or renewing a dynamically assigned host IP address in a data communications network employing the dynamic host configuration protocol (DHCP) to assign IP addresses to at least some devices on the network.

BACKGROUND OF THE INVENTION

Computer networks that use the Internet Protocol (IP) are commonly referred to as "IP networks." Within such IP networks, host systems and other devices are identified by numbers, known as IP Addresses. IP addresses provide a simple mechanism for identifying the source and destination address of messages sent within IP networks.

Managing a large Transmission Control Protocol/Internet Protocol (TCP/IP) network requires maintaining accurate and up-to-date IP address and domain name information. In the past, organizations responsible for such networks were required to manage IP addresses and domain names by manually modifying and configuring a number of databases. Static (i.e. unchanging) IP addresses were also manually configured into personal computers (PCs). This approach has created problems since the tasks were tedious and one incorrect digit in an IP address or incorrect character in a domain name could cause significant problems for users of the World Wide Web, network file systems, or electronic mail.

One protocol which has been developed to dynamically assign IP addresses within IP networks is DHCP. DHCP provides a framework to pass configuration information to hosts, also called DHCP clients, on a TCP/IP network. DHCP defines the mechanisms through which clients are assigned an IP address for a finite lease period, allowing for reassignment and reuse of a particular IP address to different clients in the future. DHCP also provides a mechanism for a client to gather all of the IP configuration parameters that it needs in order to operate within the TCP/IP network. FIG. 1 illustrates a network using DHCP. Hosts 10($a$-N) (N is an integer) are connected to a customer premises equipment device 12 (CPE) such as a router, switch or bridge. The CPE is coupled to one or more address allocation devices 16($a$-N). The address allocation devices 16($a$-N) may be DHCP servers that allocate host addresses, such as IP addresses, to the hosts 10($a$-N). CPE 12 may also include its own address allocation mechanism.

FIG. 2 shows the format of a typical DHCP packet 14. Since such DHCP packets 14 are well known to those of ordinary skill in the art, only the fields of interest will be discussed. Each DHCP packet 14 has a type, as further discussed below, which may be: "Discovery", "Offer", "Request", or "Acknowledgement". The type of DHCP packet 14 is encoded into the options field 18. The options field 18 may also be used for other purposes, such as the encoding of vendor specific information. The address allocation device 16 always uses its own address in the server identifier field 22, or siaddr, so that the packet will be returned to the address allocation device. The ciaddr field 24 is used to store the client identifier, typically the message authentication code (MAC) address. The giaddr field 26 is used to store a relay agent address, such as a server or any other relay agent sending or relaying the DHCP packet 14 to the host 10($a$-N).

DHCP enables hosts 10($a$-N) on an IP network to obtain their configurations from the address allocation device 16($a$-N). This, in turn, reduces the work necessary to administer an IP network. As discussed above, there are four packet types in DHCP, as shown in FIG. 3 using host 10$a$ and address allocation device 16$a$ as an example. The first DHCP packet type is a Discovery packet, where a host 10$a$ broadcasts a Discovery message over the Network in order to locate an address allocation device 16($a$-N) and obtain a host address, such as an IP address. The host 10$a$ may include in the Discovery packets a suggested host address and suggested lease duration. The second DHCP packet type is the Offer packet. The address allocation device 16$a$ responds to the Discovery packet with a unicast offer message that includes an available host IP address and other configuration parameters. The host may receive more than one offer from multiple address allocation devices and may accept any one of the offers, however, a host 10$a$ will usually accept the first offer it receives. The third packet type is the Request packet where the host 10$a$ broadcasts a Request packet to formally accept the offered host address from the Offering device and implicitly tell other address allocation devices that it declines their offers. Finally, the last packet is the Acknowledgment packet where the selected address allocation device sends the host a unicast acknowledgment message acknowledging the Offer and including other necessary configuration parameters.

One disadvantage of DHCP is that the address allocation device does not give a network administrator much option to define, manage, or control host address allocation much less to implement host address allocation policies. The host 10($a$-N) sends the data packet directly to the address allocation devices 16($a$-N) and the address allocation devices 16($a$-N) send the replies directly to the hosts. There are situations where network administrators may wish to constrain the allocation of host addresses to only authorized hosts and may want to authenticate the source and contents of the data packets, such as for security purposes. Moreover, a network administrator may want an accounting of the host activities such as logon and logoff times, whether the host's bills are paid and up-to-date, the number of incoming and outgoing data packets for each host, and other similar accounting information. Additionally, a network administrator may want to add additional services to make the network more efficient, such as virus detection. Thus, there exists a need for an efficient manner for a network administrator to define, manage and control host address assignment, host address allocation policies, and to authenticate and account for host addresses to provide for additional security and/or additional value added services.

BRIEF DESCRIPTION OF THE INVENTION

This invention provides a method and apparatus for issuing or renewing a host address. The apparatus has an input device to receive a data packet having a host identifier, a memory to store a list of host identifiers, and a processor to match the host identifier with the list of host identifiers. If a match is found, an output device transmits the data packet to an address allocation device to issue or renew the host address. The method provides for retrieving the host identifier in the header of the data packet, matching the host identifier with a list of host identifiers, and maintaining a state of authentication for the host if a match is found, otherwise maintaining a state of unauthentication for the host. The method further provides for inserting a proxy address in a relay agent address field, setting a flag, and transmitting the data packet to an address allocation device to issue or renew the host address. The proxy address is also set in a server identifier address field and the flag is unflaged before any data packets are forwarded to the host.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 2 is a diagram of the fields in a conventional DHCP packet.

DETAILED DESCRIPTION

Embodiments of the present invention are described herein in the context of a system and method for DHCP Proxy. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
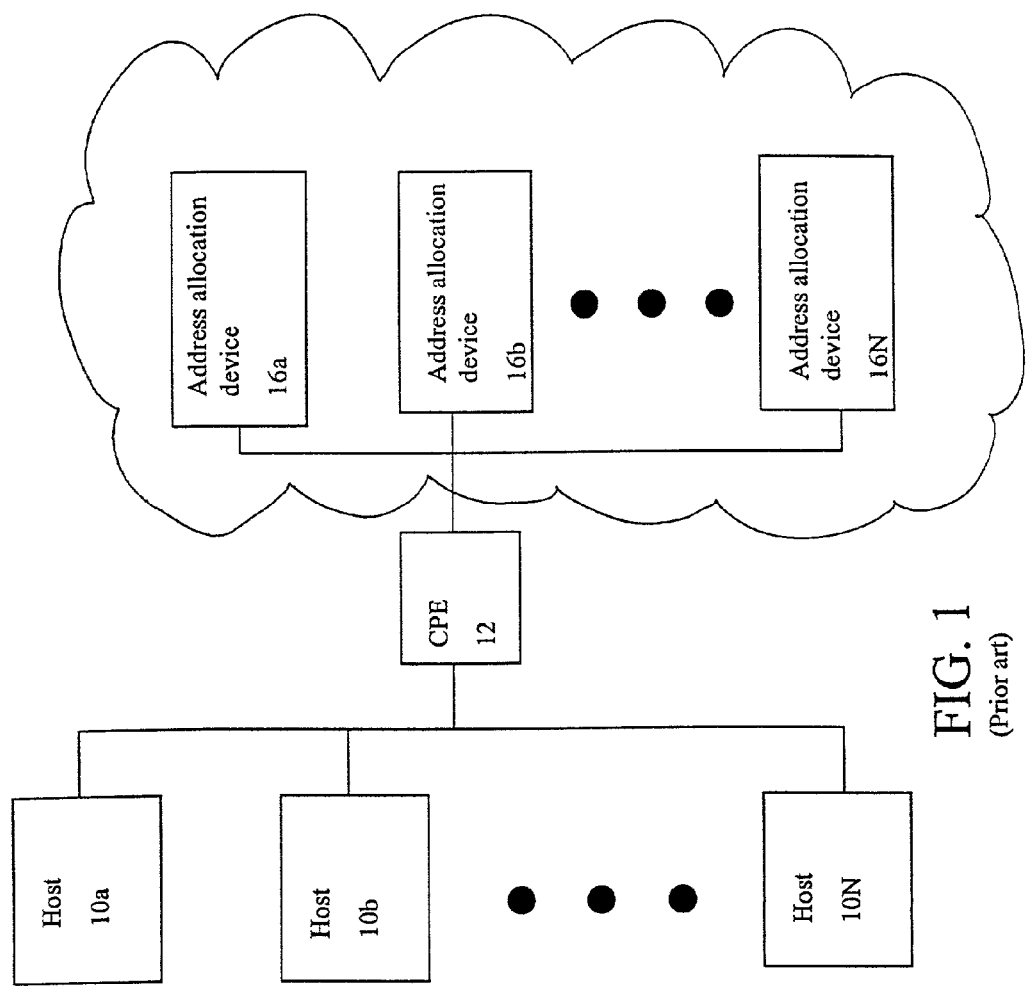
FIG. 1 is a diagram of an IP network in accordance with the prior art.
Figure 3:
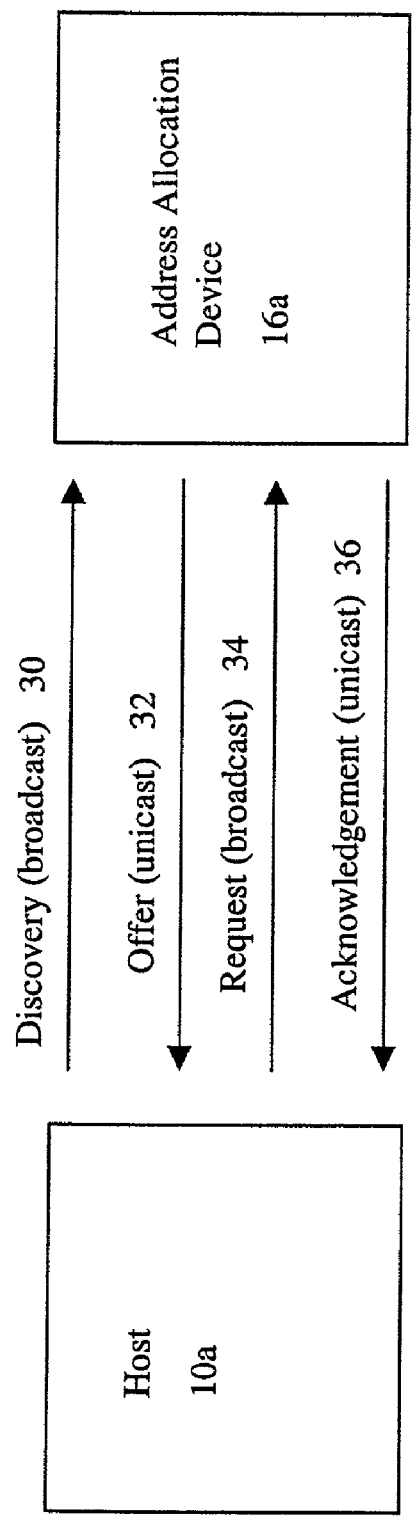
FIG. 3 is a diagram illustrating the exchange of the four types of DHCP packets between a host and Address allocation device in accordance with the prior art.
Figure 4:
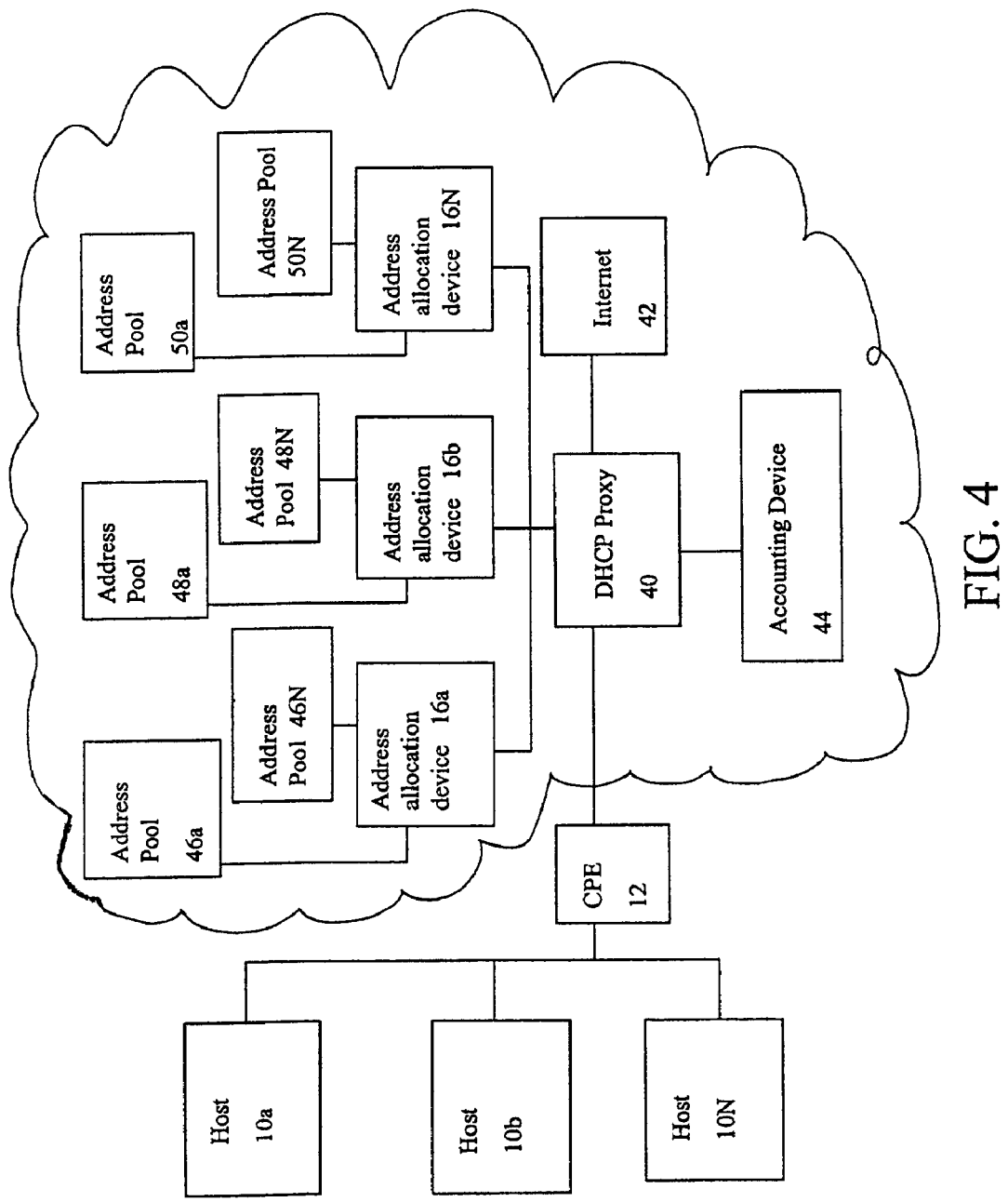
FIG. 4 is a system block diagram illustrating a specific embodiment of the present invention.

This invention provides for an apparatus to issue or renew a host address in a network using DHCP. The apparatus will allow a network administrator to control and monitor the assignment of host addresses. The apparatus, which may be termed DHCP proxy, may forward, drop, or return any packets it receives. As shown in FIG. 4, the DHCP proxy 40 is connected to hosts 10($a$-N) via the CPE 12, address allocation devices which may be DHCP servers 16($a$-N), and any other destinations or gateways, such as the Internet 42. When the DHCP proxy 40 receives a packet, typically a DHCP packet, from a host 10($a$-N), the DHCP proxy 40 identifies the host 10($a$-N) by looking at the host identifier, which is usually located in the ciaddr field. The host identifier may be the MAC address, a password, source address, user name, or any other like identifiers. Those of ordinary skill in the art will recognize that there are many other means with which to identify the hosts.

Figure 5A:
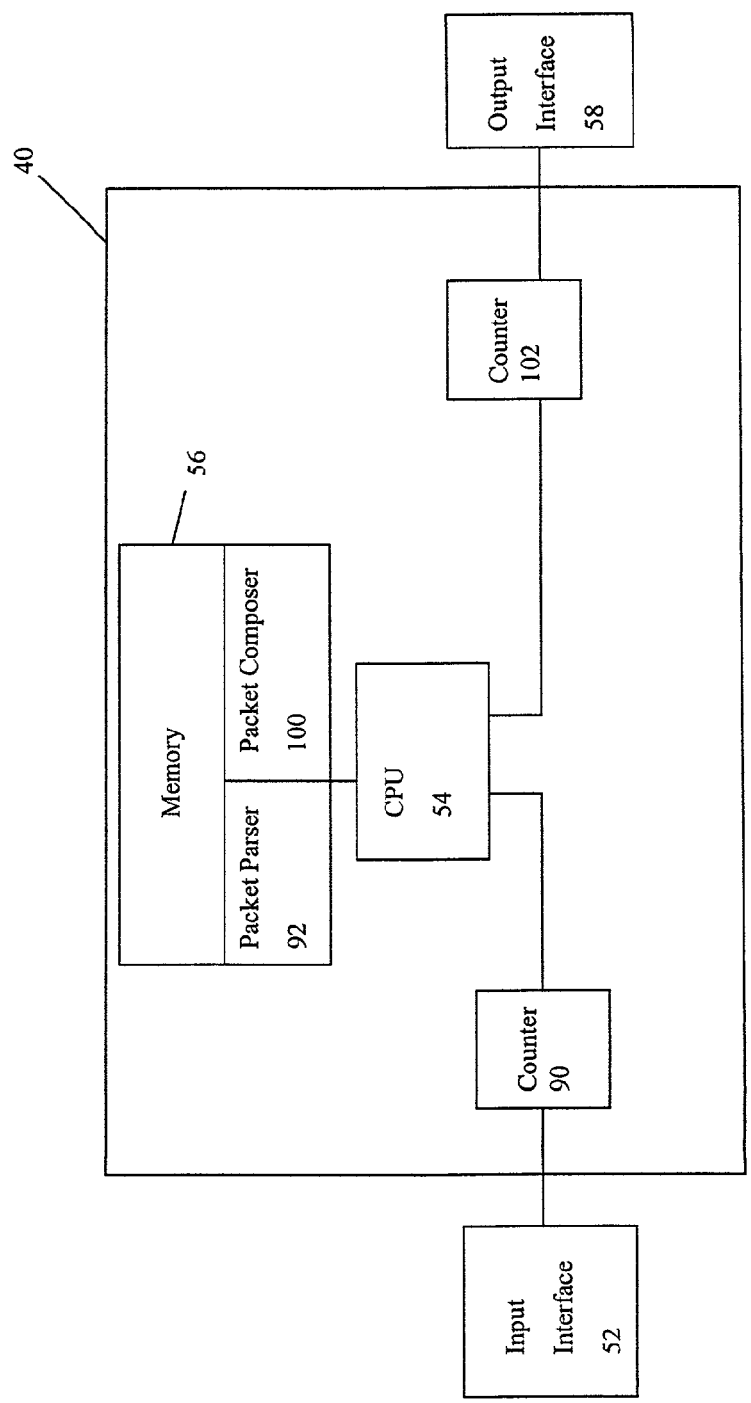
FIG. 5A is a system block diagram illustrating a specific embodiment of the present invention.
Figure 5B:
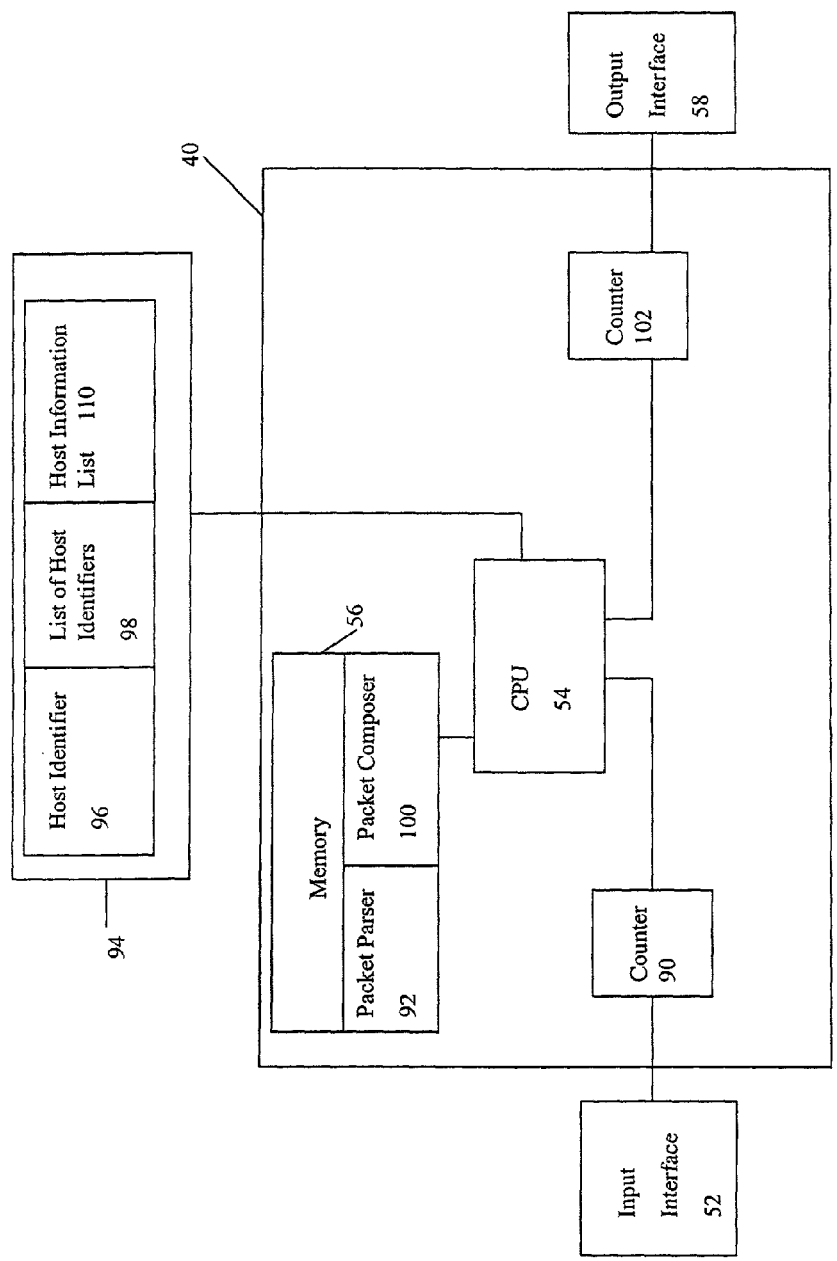
FIG. 5B is a system block diagram illustrating yet another specific embodiment of the present invention.

Once the host identifier is located, the DHCP proxy 40 can then authenticate the host. The DHCP proxy 40 authenticates a host from its packet by matching the host identifier in a list of host identifiers. In one embodiment, the DHCP proxy may have a memory 56, as shown in FIG. 5A, which stores and pairs information such as the host identifiers with the list of host identifiers and a host identifier information list, or any other information. In yet another embodiment, the DHCP proxy may retrieve the necessary information from an external database 94, such as another server, as shown in FIG. 5B. The external database 94 may store and pair information such as the host identifier 96 with the list of host identifiers 98 with a host information list 110. The host information list may contain any information configured into the DHCP proxy by the network administrator, such as the host address, lease information, accounting information, user name, ISP provider, and the like. Thus, the lists may be created or edited by the network administrator by either manually configuring the list or having the DHCP proxy retrieve the lists from an external database. Those of ordinary skill in the art will now realize that there are other mechanisms to obtain the lists such as to have the client register itself to the DHCP proxy. If the host identifier is not located in the list of host identifiers, the packet is either dropped or returned to the host 10($a$-N). The host 10($a$-N) is then maintained in a state of unauthentication, which may be accomplished in many ways. One example is to flag the host identifier as an unauthenticated host.

If the host identifier is located on the list of host identifiers, the host 10($a$-N) is maintained in a state of authentication. The DHCP proxy 40 then inserts its proxy address in the relay agent address field or giaddr field so that the DHCP packet, after leaving an address allocation device, such as a DHCP server 16($a$-N), will communicate with the DHCP proxy 40 rather than directly with the host 10($a$-N). In current networks, address allocation devices 16($a$-N) send the packets, whether it is a DHCP Offer or Acknowledgment packet, directly to the host and thus, the network administrator is unable to maintain control over host address allocations. By setting the giaddr field to the DHCP proxy address, the Offer and Acknowledge packets will always return to the host 10($a$-N) via the DHCP proxy 40. This allows for the DHCP proxy 40 to maintain control by monitoring the information exchanged between the address allocation device 16($a$-N) and host 10($a$-N).

The DHCP proxy also flags an option called the Relay Agent Information option, also known as Option 82. Option 82 is well known to those of ordinary skill in the art and thus only a brief overview is provided herein. Option 82 is a way to index host addresses based on information set in the options field of the packet. Option 82 is flagged by the DHCP proxy when forwarding client-originated DHCP packets to the address allocation device. Address allocation devices recognizing the Relay Agent Information option utilizes the information set in the options field to allocate host addresses. Option 82 is unflaged before any DHCP packets are forwarded to the host.

The advantage of Option 82 is to provide a more efficient and organized manner to allocate host addresses. The network administrator may choose how to allocate host addresses, for example, by ISP providers. Thus, if Option 82 is flagged, the address allocation device will allocate host addresses based upon the ISP provider for the host. For example, the DHCP proxy 40 identifies ISP.NET as the ISP for the host and sets Option 82 in the options field with ISP.NET as the ISP. The address allocation device will obtain the host address from an address pool 46,48,50 (a-N) that is used only for ISP.NET customers.

Option 82 also provides additional security in a network. It is a mechanism which helps to decrease security attacks on the operation of host address assignment such as IP spoofing, client identification spoofing, and MAC address spoofing. Option 82 further assists a network by organizing the allocation of IP addresses to prevent DHCP server address exhaustion.

The DHCP proxy 40 also sets the siaddr field in the DHCP packet to the proxy address. In current networks, the address allocation device always uses its own address in this field so that the DHCP packet will be returned directly to the address allocation device. Thus, the DHCP packet, whether it is a DHCP Discovery or Request packet, is always sent directly to the address allocation device 16(a-N). Thus, the network administrator is unable to maintain any control. By setting the siaddr field to the DHCP proxy address, the DHCP packet will be forwarded to the address allocation device 16(a-N) via the DHCP proxy 40. This allows the DHCP proxy 40 to maintain control by monitoring the information sent between the host 10(a-N) and the address allocation device 16(a-N).

Setting the giaddr and siaddr fields to the DHCP proxy address has further advantages. As described above, when a host 10(a-N) requests a host address, such as an IP address, from a address allocation device 16(a-N), the DHCP packet sent to the address allocation device 16(a-N) is usually a DHCP Discovery packet requesting the host address. However, should the host 10(a-N) already have a host address and merely wants to change the existing host address, existing lease term, or any other parameter configurations, the host 10(a-N) will merely send the address allocation device 16(a-N) a DHCP Request packet. Thus, by changing the giaddr and siaddr fields to the DHCP proxy address, this ensures that if the DHCP packet is a packet other than a Discovery or Offer packet, the DHCP packet will continue to be forwarded to the DHCP proxy 40.

FIGS. 5A and 5B are system block diagrams illustrating specific embodiments of the present invention. The DHCP proxy 40 has an input interface 52 to receive packets, such as DHCP packets. The input interface 52 is coupled to a counter 90, which maintains accounting information relating to the hosts, which will be described below. The counter 90 is coupled to a central processing unit 54 (CPU) which is coupled to a memory 56. The memory 56 may store information such as the list of host identifiers, a host information list, and any other necessary data. The memory also contains a packet parser 92 and packet composer 100. The packet parser 92 identifies and locates the necessary fields of the packet, such as the siaddr 22 or the giaddr 26. The packet composer 100 recomposes the packet for output through the output interface 58. Another counter 102 is coupled between the CPU 54 and output interface 58 to obtain accounting information of the host. In an alternative embodiment as shown in FIG. 5B, the CPU 54 may be coupled to an external database 94 which stores the host identifier 96, list of host identifiers 98, host information 110, or any other necessary data.

The present invention also allows a network administrator to maintain account information on a host using the counters 90, 102. The information may be stored in the memory of the DHCP proxy 40 or the DHCP proxy 40 may be coupled to an accounting device 44 to store all the information relating to the hosts 10(a-N). The accounting device 44 may contain information such as when a host 10(a-N) logged on or off, whether the host is current on his bills, the number of packets received and sent by the host, and other like information. The counters 90, 102 are used to maintain such accounting information.

Figure 6:
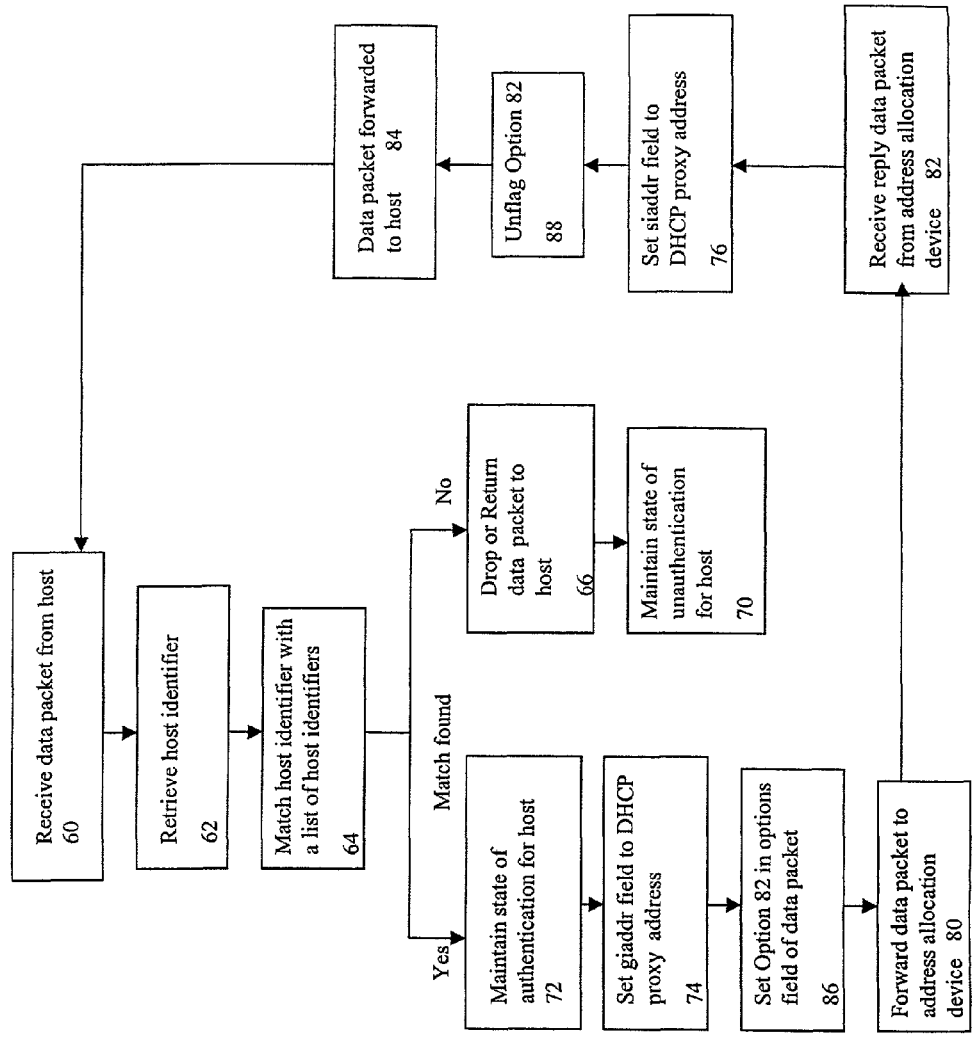
FIG. 6 is a flow diagram illustrating a method in accordance with a specific embodiment of the present invention.

Turning now to FIG. 6, a flow diagram illustrates a method for issuing or renewing a host address in a network using DHCP. The host sends a packet, typically a DHCP packet, to request the renewal or issuance of a host address, such as an IP address, to a DHCP proxy (60). The DHCP proxy then retrieves the host identifier in the packet, which is usually located in the ciaddr field in the packet (62). The host identifier may be the MAC address, a password, source address, user name, or any other like identifiers. Those of ordinary skill in the art will now recognize that there are many other means with which to identify a host.

Once the host identifier is located, the DHCP proxy then authenticates the host. The DHCP proxy matches the host identifier with a list of host identifiers (64). If the host identifier is not located in the list of host identifiers, the packet may either be dropped or returned to the host (66) and the host is maintained in a state of unauthentication (70), which may be accomplished in many ways. One example is to flag the host identifier as an invalid host.

If the host identifier is matched with the list of host identifiers, the host is maintained in a state of authentication (72). The DHCP proxy inserts its proxy address into the relay agent address field or giaddr field (74) so that the packet, after leaving the address allocation device, will communicate with the DHCP proxy rather than directly with the host. In current networks, the address allocation device sends the packet, whether it is a DHCP Offer or Acknowledgment packet, directly to the host and thus, the network administrator is unable to maintain control over host address allocations. By setting the giaddr field to the DHCP proxy address, the Offer and Acknowledge packets will always return to the host via the DHCP proxy. This allows for more control by monitoring the information exchanged between the address allocation device and the host.

Option 82, also known as the Relay Agent Information option, is flagged before forwarding client-originated DHCP packets to the address allocation device, such as a DHCP server (86). Option 82 is a way to index host addresses based on information set in the options field of the DHCP packet. When Option 82 is flagged, address allocation devices use the information in the options field to assign and allocate host addresses. Option 82 is unflaged before any DHCP packets are forwarded to the host (88). The network administrator configures the DHCP proxy to determine what information is used to allocate host addresses, for example, by ISP provider. Once an allocation method is configured, the address allocation device chooses host addresses only from a certain address pool. For example, the DHCP proxy identifies ISP-.NET as the ISP for the host, sets option 82 in the options field and references ISP.NET as the ISP. The address allocation device will note that ISP.NET is the ISP provider, and obtains a host address from the address pool that is used only for ISP.NET customers.

Option 82 provides additional security in a network. It is a mechanism which helps to decrease security attacks on the operation of host address assignment such as IP spoofing, client identification spoofing, and MAC address spoofing. Option 82 further assists a network by organizing the allocation of IP addresses to prevent DHCP server address exhaustion.

The DHCP packet is then transmitted to an address allocation device for renewal or issuance of a host address (80). If the DHCP packet is a DHCP Discovery packet, the address allocation device will reply with a DHCP Offer packet. If the DHCP packet is a Request packet, the address allocation device will reply with an Acknowledgment packet. Whatever type of reply is received from the address allocation device, Option 82 is unflaged (88) and the siaddr field is set to the DHCP proxy address (76) before any replies are forwarded to the host. Current networks are implemented such that the address allocation device always sets its address in the siaddr field so that the DHCP packets return directly to it. Thus, the DHCP packet, whether the DHCP Discovery or Request packet, is always sent directly to the address allocation device. Thus, the network administrator is unable to maintain any control. By setting the siaddr field to the DHCP proxy address, the DHCP packet will be forwarded to the DHCP proxy before being forwarded to the address allocation device. This allows the DHCP proxy to maintain control by monitoring the information sent between the host and the address allocation device.

Setting the giaddr and siaddr fields to the DHCP proxy IP address has further advantages. As described above, when a host requests a host address from an address allocation device, the DHCP packet sent to the address allocation device is a DHCP Discovery packet. However, should the host already have a host address and merely wants to change the existing host address, existing lease term, or any other parameter configurations, the host will merely send the address allocation device a DHCP Request packet. Thus, by changing the giaddr and siaddr fields to the DHCP proxy address, this ensures that if the DHCP packet is a packet other than a Discovery or Offer packet, the DHCP packets will continue to be forwarded to the DHCP proxy.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for handling a request for a network address allocation, the method comprising:
   retrieving a host identifier from the request;
   matching said host identifier with a list of host identifiers;
   maintaining a state of authentication for a host associated with said host identifier if a match is found;
   inserting a proxy address in a relay agent address field in the request;
   transmitting said request to an address allocation device to issue or renew a host address if said host associated with said host identifier is in a state of authentication;
   receiving a response from said address allocation device;
   modifying a value in a server identifier field in said response to match said proxy address; and
   transmitting said response to said host associated with said host identifier.

2. The method of claim 1, wherein said host identifier is a MAC address.

3. The method of claim 1, further comprising storing said list of host identifiers in a memory.

4. The method of claim 1, further comprising pairing said list of host identifiers with a host information list.

5. The method of claim 1, further comprising discarding the request if said host associated with said host identifier is not in a state of authentication.

6. The method of claim 1, further comprising querying an accounting device to obtain account information for said host associated with said host identifier.

7. The method of claim 1, wherein said inserting a proxy address in a relay agent address field further comprises flagging an option 82 option in the request.

8. A method for handling a DHCP discovery packet, the method comprising:
   retrieving a host identifier from the DHCP discovery packet;
   matching said host identifier with a list of host identifiers;
   maintaining a state of authentication for a host associated with said host identifier if a match is found;
   inserting a proxy address in a gateway IP address (GIADDR) field in the DHCP discovery packet;
   transmitting the DHCP discovery packet to an address allocation device to issue or renew a host address if said host associated with said host identifier is in a state of authentication;
   receiving a DHCP offer packet from said address allocation device;
   modifying a value in a server identifier address (SJADDR) field in said DHCP offer packet to match said proxy address; and
   transmitting said DHCP offer packet to said host associated with said host identifier.

9. The method of claim 8, wherein said host identifier is a MAC address.

10. The method of claim 8, further comprising storing said list of host identifiers in a memory.

11. The method of claim 8, further comprising pairing said list of host identifiers with a host information list.

12. The method of claim 8, further comprising discarding the DHCP discovery packet if said host associated with said host identifier is not in a state of authentication.

13. The method of claim 8, further comprising querying an accounting device to obtain account information for said host associated with said host identifier.

14. The method of claim 8, wherein said inserting a proxy address in a gateway IP address (GL4DDR) field further comprises flagging an option 82 option in the request.

15. Apparatus for handling a request for a network address allocation, comprising: respective interfaces to a host and an address allocation device; a central processing unit coupled the interfaces; and memory coupled to the central processing unit, the memory stores (1) information including a list of host identifiers, and (2) computer programs including a packet parser and a packet composer, wherein the central processing unit executes the packet parser and packet composer computer programs to cause the apparatus to perform a method including: receiving the request from the host; retrieving a host identifier from the request; matching said host identifier with the list of host identifiers; maintaining a state of authentication for the host associated with said host identifier if a match is found; inserting a proxy address in a relay agent address field in the request; transmitting said request to an address allocation device to issue or renew a host address if said host associated with said host identifier is in a state of authentication; receiving a response from said address allocation device; modifying a value in a server identifier field in said response to match said proxy address; and transmitting said response to said host associated with said host identifier.

16. The apparatus of claim 15, wherein said host identifier is a MAC address.

17. The apparatus of claim 15, wherein the method performed by the central processing unit further comprises storing said list of host identifiers in a memory.

18. The apparatus of claim 15, wherein the method performed by the central processing unit further comprises pairing said list of host identifiers with a host information list.

19. The apparatus of claim 15, wherein the method performed by the central processing unit further comprises discarding the request if said host associated with said host identifier is not in a state of authentication.

20. The apparatus of claim 15, wherein the method performed by the central processing unit further comprises querying an accounting device to obtain account information for said host associated with said host identifier.

21. The apparatus of claim 15, wherein said inserting a proxy address in a relay agent address field further comprises flagging an option 82 option in the request.

22. A DHCP proxy for handling a DHCP discovery packet, comprising: respective interfaces to a host and an address allocation device; a central processing unit coupled to the interfaces; and memory coupled to the central processing unit, the memory stores (1) information including a list of host identifiers, and (2) computer programs including a packet parser and a packet composer, wherein the central processing unit executes the packet parser and packet composer computer programs to cause the apparatus to perform a method including: retrieve the DHCP packet from the host; retrieving a host identifier from the DHCP discovery packet; matching said host identifier with the list of host identifiers; maintaining a state of authentication for the host associated with said host identifier if a match is found; inserting a proxy address in a gateway IP address (GIADDR) field in the DHCP discovery packet; transmitting the DHCP discovery packet to an address allocation device to issue or renew a host address if said host associated with said host identifier is in a state of authentication; receiving a DHCP offer packet from said address allocation device; modifying a value in a server identifier address (SJADDR) field in said DHCP offer packet to match said proxy address; and transmitting said DHCP offer packet to said host associated with said host identifier.

23. The DHCP proxy of claim 22, wherein said host identifier is a MAC address.

24. The DHCP proxy of claim 22, wherein the method performed by the central processing unit further comprises storing said list of host identifiers in a memory.

25. The DHCP proxy of claim 22, wherein the method performed by the central processing unit further comprises pairing said list of host identifiers with a host information list.

26. The DHCP proxy of claim 22, wherein the method performed by the central processing unit further comprises discarding the DHCP discovery packet if said host associated with said host identifier is not in a state of authentication.

27. The DHCP proxy of claim 22, wherein the method performed by the central processing unit further comprises querying an accounting device to obtain account information for said host associated with said host identifier.

28. The DHCP proxy of claim 22, wherein said inserting a proxy address in a gateway IP address (GL4DDR) field further comprises flagging an option 82 option in the request.

* * * * *